US008614747B2

(12) United States Patent
Alt et al.

(10) Patent No.: US 8,614,747 B2
(45) Date of Patent: Dec. 24, 2013

(54) COMPOSITE IMAGE GENERATING SYSTEM, OVERLAYING CONDITION DETERMINING METHOD, IMAGE PROCESSING APPARATUS, AND IMAGE PROCESSING PROGRAM

(75) Inventors: Thomas Alt, Munich (DE); Peter Meier, Munich (DE); Masahiro Ookura, Tokyo (JP); Tobias Eble, Munich (DE)

(73) Assignee: Metaio GmbH, Munich (DE)

( * ) Notice: Subject to any disclaimer, the term of this patent is extended or adjusted under 35 U.S.C. 154(b) by 256 days.

(21) Appl. No.: 12/934,875

(22) PCT Filed: Mar. 26, 2009

(86) PCT No.: PCT/EP2009/002236
§ 371 (c)(1),
(2), (4) Date: Dec. 23, 2010

(87) PCT Pub. No.: WO2009/118184
PCT Pub. Date: Oct. 1, 2009

(65) Prior Publication Data
US 2011/0090343 A1 Apr. 21, 2011

(30) Foreign Application Priority Data

Mar. 27, 2008 (JP) .................. 2008-082886

(51) Int. Cl.
*H04N 5/33* (2006.01)
*G09G 5/08* (2006.01)
*G06K 9/00* (2006.01)

(52) U.S. Cl.
USPC ............ 348/164; 345/166; 345/427; 382/118

(58) Field of Classification Search
USPC .................... 348/164; 345/156, 427; 382/118
See application file for complete search history.

(56) References Cited

U.S. PATENT DOCUMENTS

| 6,079,862 | A | * | 6/2000 | Kawashima et al. | ......... 382/103 |
| 6,130,672 | A | * | 10/2000 | Yamazaki et al. | ............ 345/427 |
| 7,023,536 | B2 | | 4/2006 | Zhang et al. | |
| 7,038,846 | B2 | | 5/2006 | Mandella | |
| 7,088,440 | B2 | | 8/2006 | Buermann et al. | |

(Continued)

FOREIGN PATENT DOCUMENTS

| WO | 02080106 | 10/2002 |
| WO | 2006011706 | 2/2006 |

*Primary Examiner* — David Czekaj
*Assistant Examiner* — Tsion B Owens
(74) *Attorney, Agent, or Firm* — O'Shea Getz P.C.

(57) ABSTRACT

A mark which at least reflects or radiates invisible light of predetermined wavelength other than visible light is added in a space of the real world. A camera apparatus comprises image capturing means for capturing a real image in which an invisible-light image may be discriminating. An image processing apparatus, comprises: mark discriminating means for discriminating at least one condition of a position of image of mark in the captured real image, a orientation of the mark, and a distance from the mark to the image capturing means, and overlaying condition determining means for determining, in correspondence with the discriminated condition, a overlaying condition which is at least one of an overlaying position which is a position of the image of the virtual object overlaid on the captured real image in the real image, an orientation of the virtual object which the image of the virtual object indicates, and a distance from a view point of viewer, of the image of the virtual object.

12 Claims, 9 Drawing Sheets

S1

(56) References Cited

U.S. PATENT DOCUMENTS

| | | |
|---|---|---|
| 7,110,100 B2 | 9/2006 | Buermann et al. |
| 7,113,270 B2 | 9/2006 | Buermann et al. |
| 7,161,664 B2 | 1/2007 | Buermann et al. |
| 7,203,384 B2 | 4/2007 | Carl |
| 7,239,752 B2 | 7/2007 | Neumann et al. |
| 7,268,956 B2 | 9/2007 | Mandella |
| 7,283,758 B2 * | 10/2007 | Murakami .............. 399/45 |
| 7,474,809 B2 | 1/2009 | Carl et al. |
| 7,714,895 B2 | 5/2010 | Pretlove et al. |
| 7,729,515 B2 | 6/2010 | Mandella et al. |
| 7,826,641 B2 | 11/2010 | Mandella et al. |
| 7,956,325 B2 * | 6/2011 | Tanimoto .............. 250/332 |
| 7,961,909 B2 | 6/2011 | Mandella et al. |
| 2005/0168437 A1 | 8/2005 | Carl et al. |
| 2007/0098234 A1 | 5/2007 | Fiala |
| 2007/0145273 A1 | 6/2007 | Chang |
| 2008/0150890 A1 * | 6/2008 | Bell et al. .............. 345/156 |
| 2009/0244097 A1 * | 10/2009 | Estevez .............. 345/633 |
| 2011/0227915 A1 | 9/2011 | Mandella et al. |
| 2012/0038549 A1 | 2/2012 | Mandella et al. |
| 2013/0194418 A1 | 8/2013 | Gonzalez-Banos et al. |

\* cited by examiner

COMPOSITE IMAGE GENERATING SYSTEM, OVERLAYING CONDITION DETERMINING METHOD, IMAGE PROCESSING APPARATUS, AND IMAGE PROCESSING PROGRAM

This application is entitled to the benefit of, and incorporates by reference essential subject matter disclosed in PCT Application No. PCT/EP2009/002236 filed on Mar. 26, 2009, which claims priority to Japanese Patent Application No. 2008-082886 filed Mar. 27, 2008.

BACKGROUND OF THE INVENTION

1. Technical Field

The present invention relates to the technical field of a composite image generating system, an overlaying condition determining method, an image processing apparatus, and an image processing program which overlays an image of at least one virtual object on an image of the real world, generating a composite image of the real world and the virtual object, and realizing augmented reality.

2. Background Information

A technique of overlaying an image of a virtual object on an image of the real world (or, an object which exists in a real space) to provide an image in which it looks as if the virtual object existed in the real world to augment a real world, is called "Augmented Reality" (hereinafter, referred to as "AR"). (For Example, please see Japanese patent Laid-open No. 2004-213673; Japanese patent Laid-open No. 2004-534963; Japanese patent Laid-open No. 2005-507109).

In such augmented reality, so that a position and an orientation of a virtual object (several virtual objects can be overlaid and each can have an individual position and orientation) as an overlaid image, a distance from a camera for capturing an image (a distance from a view point of viewer), and the like (hereinafter, referred to as "overlaying condition") do not become unnatural, it is necessary that an overlaying location, a position and an orientation (attitude) of the object to be overlaid, and the like, a distance from a camera, and the like (hereinafter, simply referred to as "condition") is exactly grasped, and an overlaying condition of an image of the virtual object is determined in correspondence with this condition.

From such point of view, in case of prior art, a technique called a marker tracking has been widely used. In such a technique, a marker (or more than one) which is a predetermined figure, and the like printed on a board, paper, and the like is located at a location, an object, and the like for which a condition needs to be grasped, a captured image is analyzed, and a position, and an orientation of marker, a distance from a camera, and the like are discriminated, so that a condition of place, object, and the like is grasped indirectly.

SUMMARY OF THE INVENTION

However, in a case where an image in which a marker is placed is image-captured, a marker which is originally unnecessary from the position of the viewer is naturally displayed in a captured image, resulting in a problem.

Further, in a case where a location or an object at which a marker is placed is not seen as an image, but is seen directly with the naked eye, such marker is also obstructive.

Further, in a case, where a marker might be a sellable item, like a playing card for playing AR-games, visible markers can easily be copied.

The present invention has been accomplished in consideration of the above problems, and it is an example of the object of the invention to provide a composite image generating system, an overlaying condition determining method, an image processing apparatus, and an image processing program which are capable of preventing a marker added to an image-captured place, an object, and the like from being obstructive and to create a marker which cannot easily be copied.

In order to solve the above problem, an embodiment according to one aspect relates to a composite image generating system, comprising a camera apparatus and an image processing apparatus, for overlaying a virtual image which is an image of at least one virtual object on a real image which is an image of the real world to generate a composite image of the real world and the virtual object, wherein at least one mark which at least reflects or radiates invisible light of predetermined wavelength other than visible light is added in a space of the real world, the camera apparatus comprises image capturing means for capturing the real image in which an invisible-light image may be discriminating, and the image processing apparatus, comprises: mark discriminating means for discriminating at least one condition of a position of an image of the mark in the captured real image, an orientation of the mark, and a distance from the mark to the image capturing means, and an overlaying condition determining means for determining, in correspondence with the discriminated condition, an overlaying condition which is at least one of an overlaying position which is a position of the image of the virtual object overlaid on the captured real image in the real image, an orientation of the virtual object which the image of the virtual object indicates, and a distance from a view point of viewer, of the image of the virtual object.

In accordance with this invention, a mark which at least reflects or radiates invisible light is added in a space of the real world, a camera apparatus captures the real image in which an invisible-light image may be discriminating, and an image processing apparatus discriminates at least one condition of a position of the mark image in a real image, an orientation of the at least one mark, and a distance from the image capturing means to the mark, and determines at least one overlaying condition of the image of the at least one virtual object to be overlaid on the real image, in correspondence with the discriminated condition.

Accordingly, since a mark cannot be directly seen with the naked eye, it is possible to prevent a real place, an object, and the like to which a mark is added, from being obstructive, in a case where they are directly seen. In an embodiment, where the invisible-light image is discriminating, since a mark cannot be directly seen with the naked eye, it is possible to prevent a real location, an object, and the like to which a mark is added, from being obstructive, in a case where they are directly seen. Further, a mark is not seen or only lightly seen on a generated composite image, and it is possible to prevent a mark from being obstructive on a composite image.

An embodiment according to another aspect relates to a composite image generating system, wherein the image capturing means of the camera apparatus captures the real image in which a visible-light image and an invisible-light image may be discriminated from each other, and the image processing apparatus further comprises composite image generating means for, based on the determined overlaying condition, generating the image of the virtual object, overlaying the image of the virtual object on the captured real image, and generating the composite image.

In accordance with this aspect, a camera apparatus captures a real image in which a visible-light image and an invisible-light image may be discriminated from each other, and an image processing apparatus, based on the determined overlaying condition, generates an image of a virtual object, overlaying the image of the virtual object on the real image, and generates a composite image.

Accordingly, it is possible to constitute a system by one camera apparatus, so it is possible to constitute a system inexpensively.

An embodiment according to another aspect relates to a composite image generating system, wherein the overlaying condition determining means determines the overlaying position in such a way that the mark image is hidden by overlaying the image of the virtual object or another virtual object on the captured real image. The virtual object and another virtual object may be overlaid at different overlaying conditions.

In accordance with this invention, a mark is not seen on a generated composite image, and it is possible to prevent a mark from being obstructive on a composite image. Also, the user is unable to extract a hidden code from the camera image in order to copy a mark.

An embodiment according to another aspect relates to a composite image generating system, wherein the image processing apparatus further comprises mark image erasing means for specifying an area which the at least one mark image occupies in the captured real image, and based on the an image outside the area, complementing the image of the real world in the area, to erase the mark image in the real image.

In accordance with this invention, a mark is not seen on a generated composite image, and it is possible to prevent a mark from being obstructive on a composite image. Also, the user is unable to extract a hidden code from the camera image in order to copy a mark.

An embodiment according to another aspect relates to a composite image generating system, wherein the composite image generating system further comprises mark hiding means, which may switch between erasing the mark image in the real image, complementing the image of the real world in the area of the mark from information outside the mark area and overlaying a virtual object or another virtual object over the real image of the mark.

In accordance with this embodiment, it is ensured, that the mark image is not obstructive and can never be identified by the user, even when the at least one mark's image in the real image constitutes a very big part of the image and it is difficult to erase it using information from the surrounding.

An embodiment according to another aspect relates to an overlaying condition determining method in a composite image generating system for overlaying at least one virtual image which is an image of at least one virtual object on a real image which is an image of the real world to generate a composite image of the real world and the virtual object, wherein at least one mark which at least reflects or radiates invisible light of predetermined wavelength other than visible light is added in a space of the real world, the camera apparatus captures the real image in which an invisible-light image may be discriminating, and the image processing apparatus discriminates at least one condition of a position of image of the mark in the captured real image, an orientation of the mark, and a distance from the mark to the image capturing means, and determines, in correspondence with the at least one discriminated condition, an overlaying condition which is at least one of an overlaying position which is a position of the image of the virtual object overlaid on the captured real image in the real image, an orientation of the virtual object which the image of the virtual object indicates, and a distance from a view point of the viewer, of the image of the virtual object.

An embodiment according to another aspect relates to an image processing apparatus for overlaying a virtual image which is an image of at least one virtual object on a real image which is an image of the real world to generate a composite image of the real world and the virtual object, wherein at least one mark which at least reflects or radiates invisible light of predetermined wavelength other than visible light is added in a space of the real world, the image processing apparatus comprises: acquiring means for acquiring the real image in which an invisible-light image may be discriminating, and which has been image-captured by a camera apparatus, mark discriminating means for discriminating at least one condition of a position of the image of at least one mark in the acquired real image, an orientation of the mark, and a distance from the mark to the image capturing means, and overlaying condition determining means for determining, in correspondence with the discriminated condition, at least one overlaying condition which is at least one of an overlaying position which is a position of the image of the virtual object overlaid on the captured real image in the real image, an orientation of the virtual object which the image of the virtual object indicates, and a distance from a view point of viewer, of the image of the virtual object.

An embodiment according to another aspect relates to an image processing program executed by a computer includes in an image-processing apparatus for overlaying a virtual image which is an image of at least one virtual object on a real image which is an image of the real world to generate a composite image of the real world and the virtual object, wherein a mark which at least reflects or radiates invisible light of predetermined wavelength other than visible light is added in a space of the real world, and the image processing program causes the computer to function as: acquiring means for acquiring the real image in which an invisible-light image may be discriminating, and which has been image-captured by a camera apparatus, mark discriminating means for discriminating at least one condition of a position of image of the at least one mark in the acquired real image, an orientation of the mark, and a distance from the mark, to the image capturing means, and overlaying condition determining means for determining, in correspondence with the discriminated condition, an overlaying condition which is at least one of an overlaying position which is a position of the image of the virtual object overlaid on the acquired real image in the real image, an orientation of the virtual object which the image of the virtual object indicates, and a distance from a view point of viewer, of the image of the virtual object.

In accordance with aspects of the invention, since a mark cannot be directly seen with the naked eye, it is possible to prevent a real place, an object, and the like to which a mark is added, from being obstructive, in a case where they are directly seen. In addition, it is not easy for users of the system to easily copy a mark, which may be a sellable item, since copy-machines and standard-printers are not prepared to scan non-visible marks.

BRIEF DESCRIPTION OF THE DRAWINGS

FIGS. 4A and 4B are views of example of generating an AR image data 105.

DETAILED DESCRIPTION OF THE INVENTION

Referring now to the drawings, embodiments of the invention will be described in detail. The embodiments mentioned below are embodiments in which the invention is applied to an AR system.

1. First Embodiment 1.1 Outline of Structure and Function of AR System

First, an outline of the structure and function of the AR system S1 according to a first embodiment will be described with reference to FIG. 1.

Figure 1:
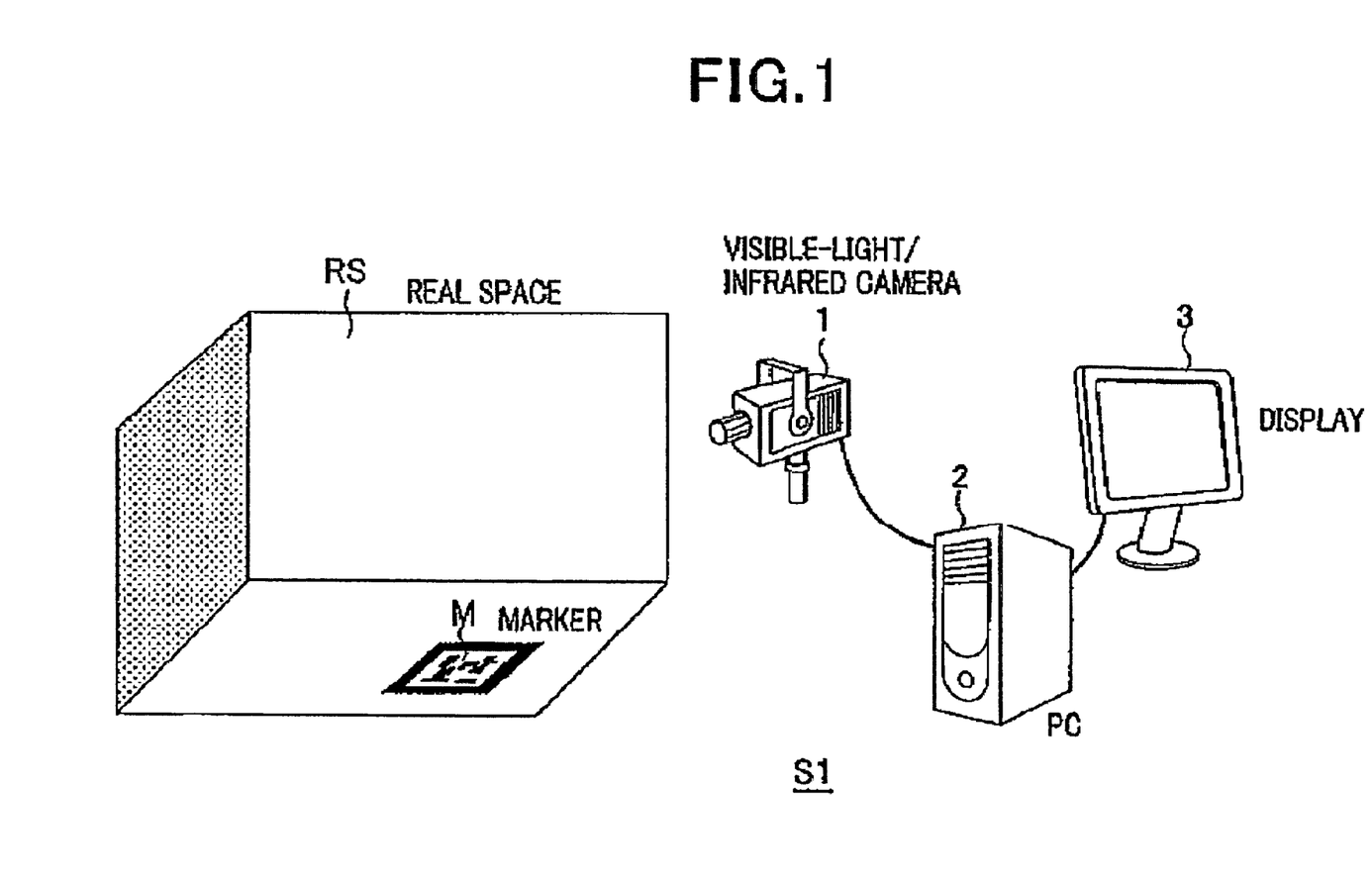
FIG. 1 is a view which shows an example of outlined structure of AR system S1 according to a first embodiment.

FIG. 1 is a view which shows an example of an outlined structure of the AR system S1 according to a first embodiment.

As shown in FIG. 1, an AR system S1 is arranged to include a visible-light/infrared camera 1 as an example of camera apparatus, a PC (Personal Computer) 2 as an example of image processing apparatus, and a display 3.

The visible-light/infrared camera 1 and the PC 2 are connected to each other by a video cable or the like. The PC 2 and the display 3 are connected to each other by a display cable or the like.

In the AR system S1 with such arrangement, as shown in FIG. 1, a marker M is located in a space RS which exists really, an image which includes the marker M is captured by the visible-light/infrared camera 1, and the PC 2 conducts an image analysis to discriminate a position, and an attitude of the marker M, and a distance from a view point of user to the marker M, and the like in the captured image (can be six degrees of freedom). Based on the result of this discrimination, the PC 2 determines a position, and an attitude of a virtual object, and a distance from a view point of the user to the virtual object, and the like, and based on the determined information, generates an image of the virtual object, and overlays it on the captured image to generate an image in which a real world is augmented by a virtual object.

The marker M is arranged, for example, by printing a predetermined figure, or the like (an example of mark) on a surface of a seal, a board, or the like with an infrared ink The infrared ink has a property of, for example, reflecting near-infrared rays of wavelength of 0.7 to 2.5 micrometer (an example of invisible light). Therefore, while a printed figure or the like (hereinafter, referred to as "an infrared mark") cannot be recognized with the naked eye, an image thereof can be captured by the visible-light/infrared camera 1. The marker can also be a combination of visible and invisible parts. For example a playing card can have a visible figure of a dragon printed on it and other invisible signs next to the dragon. A marker can be placed on a planar or a non-planar surface.

It is possible to arrange one marker M, or a plurality of markers M. In a case where a plurality of markers M are arranged in order to discriminate each of the markers M, it is desirable to print infrared marks whose figures are different from each other. Further, the marker M may be located or attached at a target place or on a target object, or may be leaned by a stick or the like. In a case where it is desirable that a seal, a board, or the like of marker M itself is not seen by a person, it is possible to, for example, directly print an infrared mark at a target place or on a target object, or paint a predetermined figure with an infrared-reflective paint.

The visible-light/infrared camera 1 is composed of, for example, an image-capturing lens, a CCD (Charge Coupled Device Image Sensor) with a distribution of sensitivity from visible light to infrared rays, a driver chip which digitizes a video signal from the CCD, and outputs the video signal through a video cable, and the like, to image-capture an object or the like in a space RS. A video signal thus obtained is supplied through a video cable to the PC 2.

Here, in order for the CCD to image-capture the marker M, the CCD needs to be arranged to have a sensitivity overlapping with a reflective property of the infrared ink printed on an infrared marker (in the embodiment, for example, so as to at least detect infrared rays with a wavelength above 0.7 micrometer).

The display 3 is composed of, for example, a liquid crystal panel or the like, and is arranged to display, on a screen, an image corresponding to a video signal supplied from the PC 2 through a display cable. The display might also be a so called head mounted display.

1.2 Structure and Function of PC 2

Figure 2:
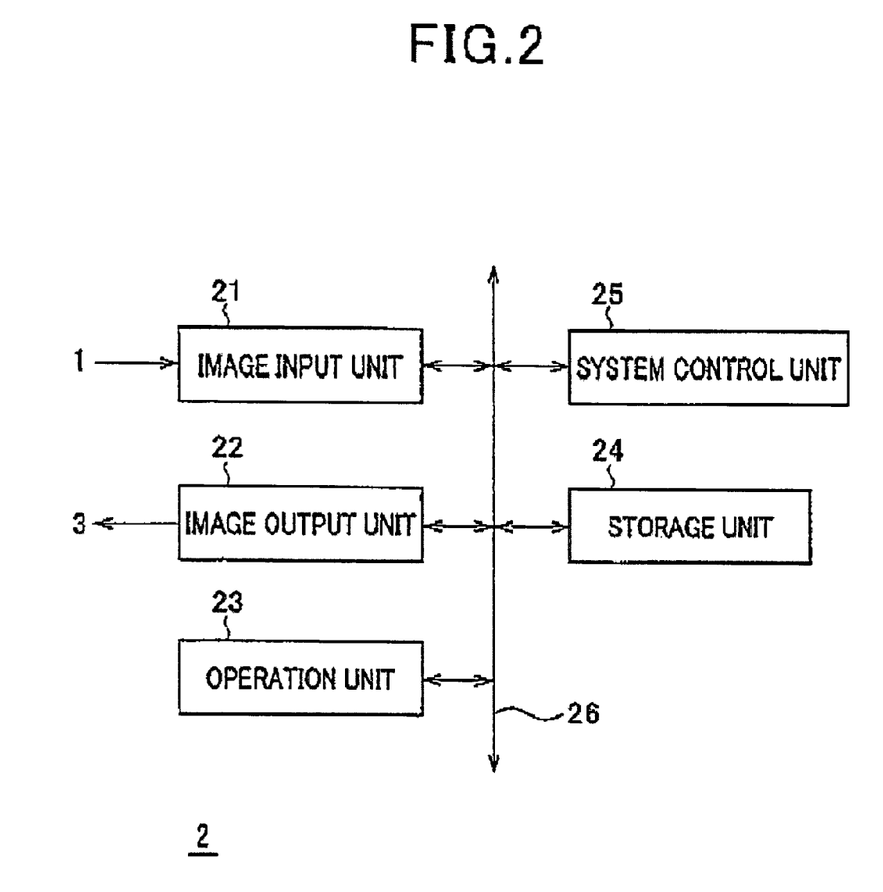
FIG. 2 is a view showing an example of schematic structure of PC 2 according to the first embodiment.

Referring now to FIG. 2, a structure and a function of the PC 2 will be described.

FIG. 2 is a view showing an example of a schematic structure of PC 2 according to the first embodiment.

As shown in FIG. 2, the PC 2 includes an image input unit 21 to which a video signal from the visible-light/infrared camera 1 is supplied, an image output unit 22 which outputs to the display 3 a video signal corresponding to a generated image data, an operation unit 23 (for example, a keyboard, a mouse, or the like) which receives an operation instruction from a user, and outputs such instructed contents as an instruction signal to a system control unit 25, a storage unit 24 (for example, a hard disc drive, or the like) as an example of storing means which stores a variety of programs and data, or the like, and the system control unit 25 which includes a CPU (Central Processing Unit), a ROM (Read Only Memory), a RAM (Random Access Memory), and the like. The system control unit 25 and the respective units are connected to each other through a system bus 26.

The storage unit 25 stores a marker figure data 102, a virtual object figure data 104, and the like. The marker figure data 102 is a data indicative of the figure of the infrared mark printed on a marker M or the combination of the infrared and the visible mark, and is composed of, for example, a position of apex, a data of line segment, a data of surface, and the like. The virtual object figure data 104 is a data indicative of a figure of at least one virtual object displayed on a display in correspondence with the marker M, and in particular, is composed of, for example, a position of apex, a data of line segments, a data of surfaces, a data indicative of colors of each surface, and reflectivity of light, and the like. An example of figure data, is data according to the VRML97-ISO 14772 standard.

The storage unit 25 stores a texture data indicative of a pattern or the like attached to a surface of the virtual object as an image data, and a data indicative of relative coordinates, an attitude, and the like of virtual object in coordinates with the marker M set as a reference, as required.

The storage unit 25 stores a program for the AR system.

In the embodiment, the system control unit 25 constitutes an example of mark discriminating means, overlaying condition determining means, mark image erasing means, composite image generating means, and the like. When the CPU reads and carries out a variety of programs stored in the ROM and the storage unit 24, the system control unit 25 controls each portion of the PC 2 in a centralized fashion. Further, when a program for AR system is read and carried out, the system control unit 25 is arranged to function as each of the above means.

1.3 Structure of Software of Program for AR System

Figure 3:
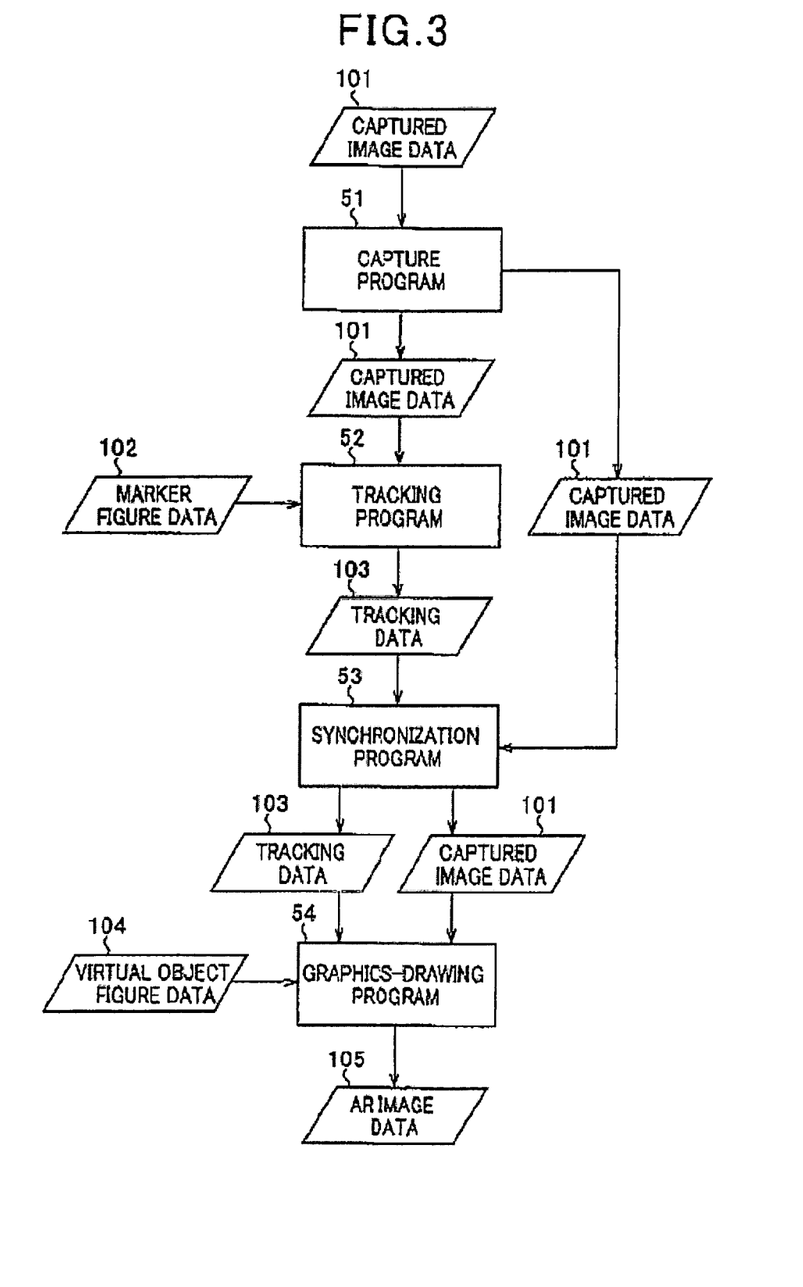
FIG. 3 is a view of an example of software structure and data flow of a program for the AR system according to the first embodiment.
Figure 4A:
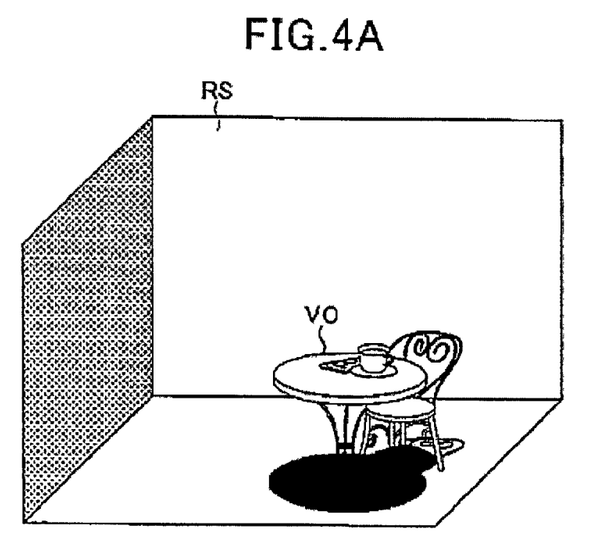
FIG. 4A is a view in which a marker M is hidden by a virtual object.
Figure 4B:
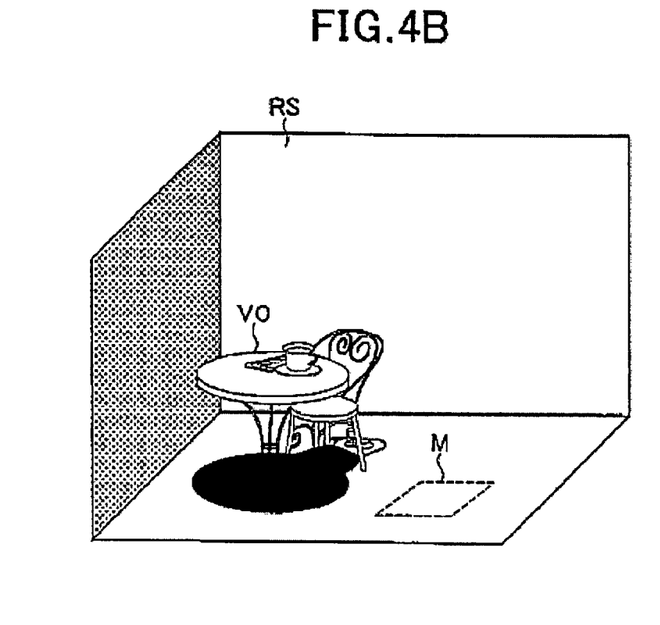
FIG. 4B is a view in which a marker M is erased.

Referring now to FIGS. 3 and 4, a structure of software of program for AR system will be described.

FIG. 3 is a view showing an example of a software structure and a data flow of the program for the AR system according to the first embodiment. FIGS. 4A and 4B are views showing an example of generating an AR image data 105.

As shown in FIG. 3, a program for the AR system is arranged to include a capture program 51, a tracking program 52, a synchronization program 53, and a graphics-drawing program 54.

The capturing program 51 is a program which causes the system control unit 25 to distribute, to the tracking program 52 and the synchronization program 53, a captured image data 101 (an example of the real image) of predetermined format converted from a video signal by the image input unit 21. Distributing the captured image data to the synchronization program is optional.

The tracking program 52 is a program for causing the system control unit 25 to function as overlaying condition determining means. Especially, the system control unit 25 conducts an image-analysis of the captured image data 101 by using the marker figure data 102, extracts an image of the infrared or infrared/visible combined mark of the marker M from the captured image data 101, discriminates coordinates (an example of overlaying position), and an attitude (for example, directions of X-axis, Y-axis, and Z-axis in coordinates with the marker M being set as a reference) in an image of the mark, and a distance from a view point of the user (an example of viewer), and supplies such information as a tracking data to the synchronization program 53. The tracking data may be expressed as a 4×4 matrix. The tracking data may additionally contain image coordinates, which indicate the position of the infrared mark in the image. Hereinafter, coordinates, an attitude, a distance from a view point of user, of the marker M are referred to as "a marker condition" (an example of condition).

The synchronization program 53 is a program for causing the system control unit 25 to check a time stamp of captured image data 101 supplied from the capturing program 51, and a time stamp of tracking data 103 supplied from the tracking program 52 (in the tracking program 52, the same time stamp as a time stamp of data of captured and analyzed image is added), and supply the captured image data 101 and the tracking data 103 whose time stamps are the same as each other, in correspondence with each other, to the graphics-drawing program 54. The synchronization program is optional and especially helpful, when the system is running in a multithreaded (parallel) way, allowing the capture program to receive frames, while the tracking program is still working.

Without synchronization program, the captured image data 101 is passed with the tracking data 103 from the tracking program to the graphics-drawing program 54.

The graphics-drawing program 54 is a program for causing the system control unit 25 to function as an overlaying condition determining means, mark image erasing means, and composite image generating means. Especially, the system control unit 25 determines coordinates and an attitude (for example, directions of X-axis, Y-axis, and Z-axis in coordinates with a virtual object set as a reference) of a virtual object as an image data of the virtual object to be overlaid and displayed on the captured image data 101, and a distance from a view point of user, in correspondence with a marker condition which a tracking data indicates.

For example, the system control unit 25 determines coordinates of virtual object in such a manner that the virtual object comes into contact with a marker M, and determines an attitude in such a manner that an upper direction of the virtual object comes into alignment with the normal of the marker M, and regards a distance from a view point of user to a virtual object as a distance from a view point of user to the marker M.

At this time, in a case where it is predetermined that a marker M is hidden by a virtual object (for example, in a case where the same coordinates as coordinates of marker M are predetermined for the virtual object, or the like), the system control unit 25 determines coordinates of a virtual object (or, an attitude, a distance from a view point of user) in such a manner that the marker M is hidden. Thus, for example, as shown in FIG. 4A, an image VO of virtual object is overlaid on an image of marker M (see FIG. 1). Hereinafter, coordinates, and an attitude of virtual object, and a distance from view point of user are referred to as "an overlaying condition". Possible tools, known to the state of art to create a 2D-image of a 3D-virtual object in space, are 3D rendering engines, like OpenGL. The virtual object overlaying the infrared marker could also be a 2D object overlaid using a 2D rendering-engine. In case of a combined visible/invisible marker, only the invisible part could be hidden. Different from FIG. 4A, there could also be more than one virtual object. One virtual object being used to hide the marker and being similar to a known background and the other object being for example a piece of furniture or an animated character.

In a case where a virtual object is not set to hide a marker M, the system control unit 25 may use a technique called an image restoring or in-painting, or the like, and erases an image of marker M in such a manner that the marker M cannot be discriminated visually in a captured image displayed by the captured image data 101. For example, if there is not a marker M, a place or an object (its portion or entity) which has been hidden by the marker M should be displayed in this area. Thus, it is thought that a line with equal light-intensity of image (a line connecting pixels with the same light-intensity) around this area is extended and drawn into an area of Marker M while the line maintains its direction. In other words, it is thought that a pattern expressed by a place or an object in an image around an area of marker M is also maintained in the area of marker M.

The system control unit 25 discriminates such direction for each pixel by conducting an image analysis, and completely paints this area in accordance with the direction and based on a data of pixel around an area of marker M. Thus, the system control unit 25 supplements an image of place or object which should be displayed in an area of marker M. Therefore, for example, as shown in FIG. 4B, an image of marker M is erased. A broken line in the drawing is shown to indicate a position of marker M for convenience, and this broken line does not remain actually. The marker erasing means could also be combined with the tracking program 52, for efficiency. The system could also switch between using marker erasing means, overlaying a virtual object or changing the appearance of the infrared marker by other means. This could be especially helpful in case the marker-image occupies a certain area of the image (for example more than 50 percent).

The system control unit 25, based on the virtual object data 104, generates an image data of a virtual object in a determined overlaying-condition. Possible tools, known to the state of art to create a 2D-image of, for example, a 3D-virtual object in space, are 3D rendering engines, like OpenGL or DirectX. The system control unit 25 overlays this image data of virtual object on the captured image data 101 in a determined position to generate a composite AR image data (an example of composite image) of real world and virtual object. This AR image data is outputted, for example, as a frame data which constitutes a portion of a motion picture.

A program for AR system may be acquired, for example, through a network from a server apparatus or the like, or may be recorded in a recorded medium such as a CD (Compact Disc), a ROM, or the like, and then read by a drive apparatus or the like.

1.4 Operation of AR System

Figure 5:
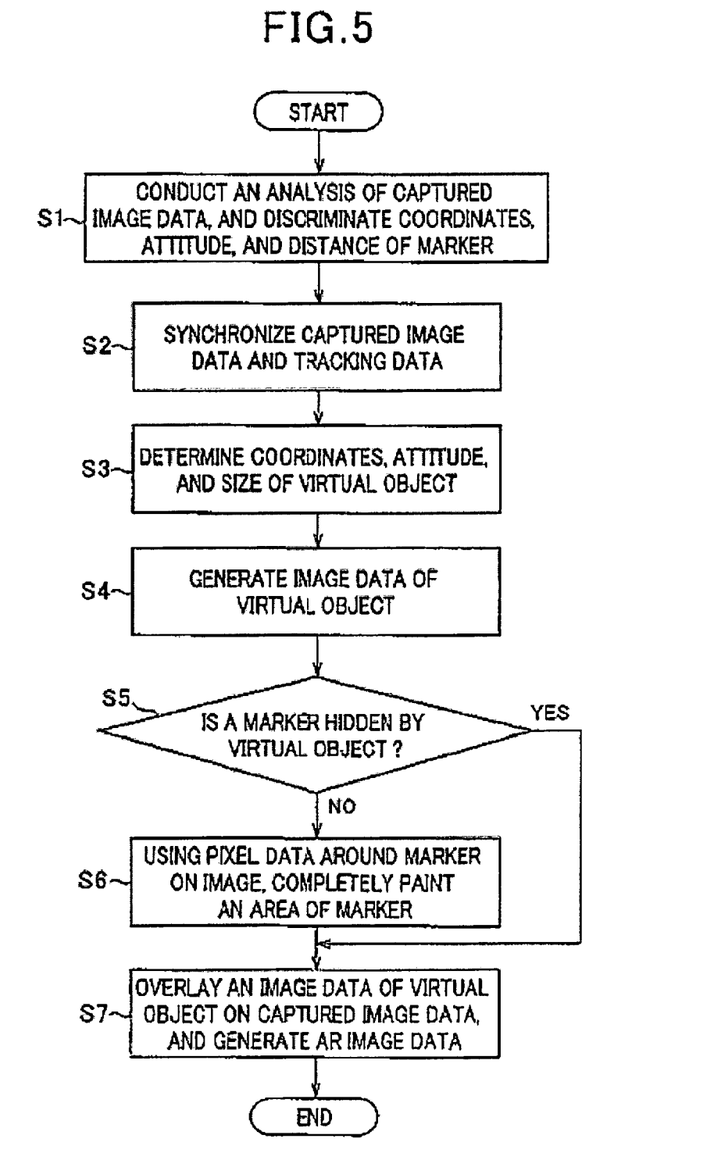
FIG. 5 is a flow chart which shows an example of processing carried out by a system control unit 25 of the PC 2 according to the first embodiment.

Referring now to FIG. 5, an operation of the AR system S1 will be described.

FIG. 5 is a flow chart which shows an example of processing carried out by the system control unit 25 of the PC 2 according to the first embodiment.

First, the visible-light/infrared camera 1 starts to capture an image by an operation of user or the like. When the visible-light/infrared camera 1 captures a marker M, it captures a visible-light/infrared image which includes an image of infrared mark M, and outputs a video signal to the PC 2.

In the PC 2, the image input unit 21 converts the inputted video signal to a captured image data 101, and outputs the captured image data 101 to the system control unit 25.

As shown in FIG. 5, in a case where the captured image data 101 is supplied from the image input unit 21, the system control unit 25 conducts an analysis of the captured image data 101, discriminates a mark condition, and generates the result as a tracking data 103 (step S1).

Then, the system control unit 25 synchronizes the captured image data 101 with the tracking data 103 (step S2). Step S2 is optional and not always necessary. Especially, the system control unit 25 monitors the supply of the captured image data 101, and the generation of the tracking data 103. When there are the captured image data 101 and the tracking data 103 whose time stamps indicate the same time, the system control unit 25 stores these data in a RAM or the storage unit 24 in such a manner that they are in correspondence with each other.

When the system control unit 25 recognizes the synchronized captured image data 101 and tracking data 103, it determines an overlaying condition of virtual object based on the tracking data 103 or the like (step S3). At this time, in a case where a marker M should be hidden by a virtual object, the system control unit 25 determines coordinates or the like of the virtual object or another virtual object in such a manner that the marker M is hidden by the virtual object.

The system control unit 25, based on the captured image data 101, generates an image data of virtual object which is a determined overlaying-condition (step S4).

The system control unit 25 judges whether a marker M should be hidden by a virtual object (step S5). At this time, in a case where the marker M should be hidden by the virtual object (step S5, YES), the system control unit 25 proceeds to a step S7.

On the other hand, in a case where the marker M should not be hidden by the virtual object (step S5, NO), the system control unit 25 may completely paint an area of marker M in an image of the captured image data 101 to erase the marker M from an image by using an method or the like mentioned above (step S6), and proceeds to a step S7. This process may also take place during tracking, when analyzing the image in step S1.

At step S7, the system control unit 25 overlays an image data of virtual object on the captured image data 101 to generate an AR image data, and sores the AR image data in a RAM or the storage unit 24 (step S7).

The generated AR image data is converted to a video signal by the image output unit 22, which is in turn outputted to the display 3. The display 3 displays an image corresponding to the supplied video signal on a screen. Thus, for example, an image shown in FIG. 4A or FIG. 4B is displayed on the screen.

As explained above, in accordance with the embodiment, a marker M on which an infrared mark which reflects infrared rays of a predetermined wavelength is printed, is arranged in a space of real world. The visible-light/infrared camera 1 captures an image in which an infrared image and an image of visible are combined and outputs a video signal corresponding to the image. The system control unit 25 in the PC 2 discriminates coordinates, and an attitude of image of marker M, and a distance from a view point of user, in the captured image data 101 corresponding to the video signal, and determines coordinates, and an attitude of virtual object as an image data of virtual object to be overlaid on the captured image data 101, and a distance from a view point of user, in correspondence with a condition of discriminated marker M.

Therefore, an infrared mark printed on a marker M cannot be directly seen by the naked eye. Accordingly, when a place, an object, or the like on which a marker M is located is directly seen, it is possible to prevent them from being obstructive.

The visible-light/infrared camera 1 captures an image in which a visible-light image can be visually discriminated in addition to an infrared image, and the system control unit 25 of the PC 2 generates an image data of virtual object based on a determined overlaying-condition, and overlays the image data of virtual object on the image data 101 to generate the AR image data 105. Accordingly, it is possible to construct a system with a standard camera, so it is possible to construct a system inexpensively, as compared with an AR system S2 according to a second embodiment described later.

Since the system control unit 25 of the PC 2 determines coordinates or the like of virtual object in such a way that an image of marker M is hidden by an image of the virtual object, an infrared mark cannot be seen on a display screen of the display 3. Accordingly, it is also possible to prevent the marker M from being obstructive on a screen.

The system control unit 25 of the PC 2 specifies an area which an image of marker M occupies in an image of captured image data 101, and complements an image of real world in the specified area based on an image around the specified area to erase the marker M. Accordingly, an infrared mark cannot be seen on a display screen of the display 3, so it is also possible to prevent the marker M from being obstructive on a screen.

1.5 Example of Application of AR System

The visible-light/infrared camera 1 and the display 3 of the AR system S1 can be applied to, for example, a notebook-size PC (personal computer) which contains a camera capable of capturing an infrared image, a cellular phone which contains a camera, or the like. At this time, discrimination of marker condition, determination of overlaying condition, and generation of image data of virtual object and AR image data may be carried out at a side of notebook-size personal computer or cellular phone (a notebook-size personal computer or a cellular phone includes a structure of PC 2). Or, for example, it is also possible that a captured image data or the like is transferred to a server apparatus by using wired or wireless communication means, and a side of the server apparatus carries out processing, and transmits a generated AR image data to a side of notebook-size personal computer or cellular phone (the server apparatus includes a structure of the personal computer PC2.).

The display 3 of the AR system S1 can be applied to a head-mounted type of display or the like. In this case, a display unit of the head-mounted type of display does not allow visible light to pass, and is arranged to display an AR image in which an image of virtual image is combined in an image of real world to be within a sight range of user to which a head-mounted display is attached. In this case, a camera is attached to a head of user, or is contained in a head-mounted display, and a capturing range of camera is set to be in alignment with a sight range of user.

In these cases, since a position and an orientation of camera or head-mounted display change dynamically, it is desirable to perform a calibration (this stands for dynamic detecting of coordinates and an orientation of camera or head-mounted display in world coordinates (coordinates of real space). In another case, a see-trough head mounted display can be used.

2. Second Embodiment

Now, a second embodiment will be described. While a case in which a standard-camera is used is described in the first embodiment mentioned above, a special camera with the ability to capture not only one combined image, but to capture two images is to be used in the second embodiment. A standard camera means a camera which has a chip (or more than one chip) with photocells, which capture light in three or four different wavelengths of the visible spectrum (for example red, green, blue or red, green, blue, emerald), where also some non visible light is captured (if there is no IR-blocking filter). A special camera chip, for example comparable to the one published in US application 20070145273 (where in our case the transparent pixels could include a filter blocking visible light and the fourth pixel wavelength is used to create a separate image or a combined image, where IR-pixels are known to be at certain positions), and the according electronics, could be capable of producing a color image and a separate IR-image. This could improve the visibility of the IR-marker to the system and improve the possibility to distinguish the IR-marker from non-IR-parts of the real world.

2.1 Outline of structure and operation of AR system

First, referring to FIG. 6, an outline of structure and operation of AR system S2 according to a second embodiment will be described.

Figure 6:
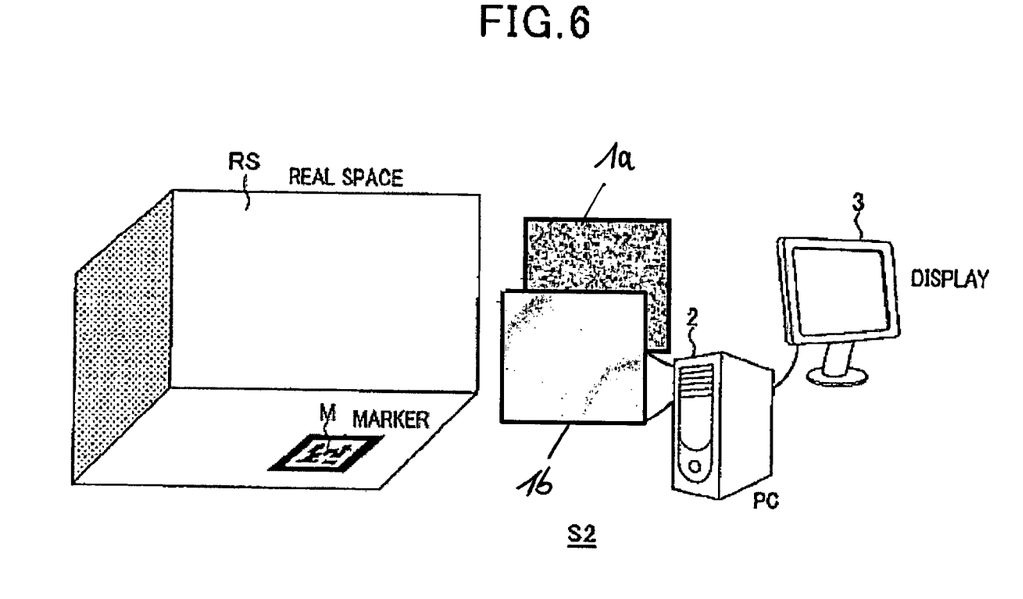
FIG. 6 is a view showing an example of outline of structure of AR system S2 according to a second embodiment.

FIG. 6 is a view showing an example of outline of structure of AR system S2 according to the second embodiment. In FIG. 6, the same reference characters are added to the same constituent elements as in FIG. 1.

As shown in FIG. 6, an AR system S2 is arranged to include a usual pixelarray 1*a*, an infrared sensorarray 1*b* (which can be mixed on a chip with 1*a* or be on a separate chip), a PC (Personal Computer) 2 as an example of image processing apparatus, and a display 3.

The usual sensorarray 1*a* is connected to the PC 2, and the infrared sensorarray 1*b* may be independently connected to the PC 2, by the respective video cables, and the like or may be connected by one cable.

The camera including the usual sensorarray 1*a* and the infrared sensorarray 1*b* is arranged to include, for example, an image-capturing lens, at least one CCD or similar with a sensitivity distribution in a frequency range of visible light and the infrared sensorarray having a sensitivity mostly in the infrared light, no IR lens-filter or visible-light-cut-filter which cuts an infrared-frequency component or visible light before reaching the chip, an infrared LED (Light Emitting Diode) which radiates infrared rays to an object to be image-captured, and the like. The LED is in many cases not necessary. The CCD or similar provides a video signal or two separate videosignals, depending on the electronics. The usual sensorarray 1*a* image-captures an object or the like in a space RS (an infrared mark printed on a marker M is not captured). The infrared sensorarray 1*b* image-captures an object or the like in a space RS (mainly an infrared mark printed on a marker M is image-captured). At least one video signal thus obtained is arranged to be supplied through a video cable to the Pc 2.

A basic structure of the PC 2 and the display 3 are the same as in the first embodiment. However, an image input unit 21 of the PC 2 is arranged to convert a video signal supplied from the usual sensorarray 1*a* to a usual captured image data 101*a* mentioned later, while converting a video signal supplied from the infrared sensorarray 1*b* to an infrared image data 101*b* mentioned later. As described before, the IR-image and the usual image, may be combined in one video signal and could be split here.

2.2 Software Structure of Program for AR system

Figure 7:
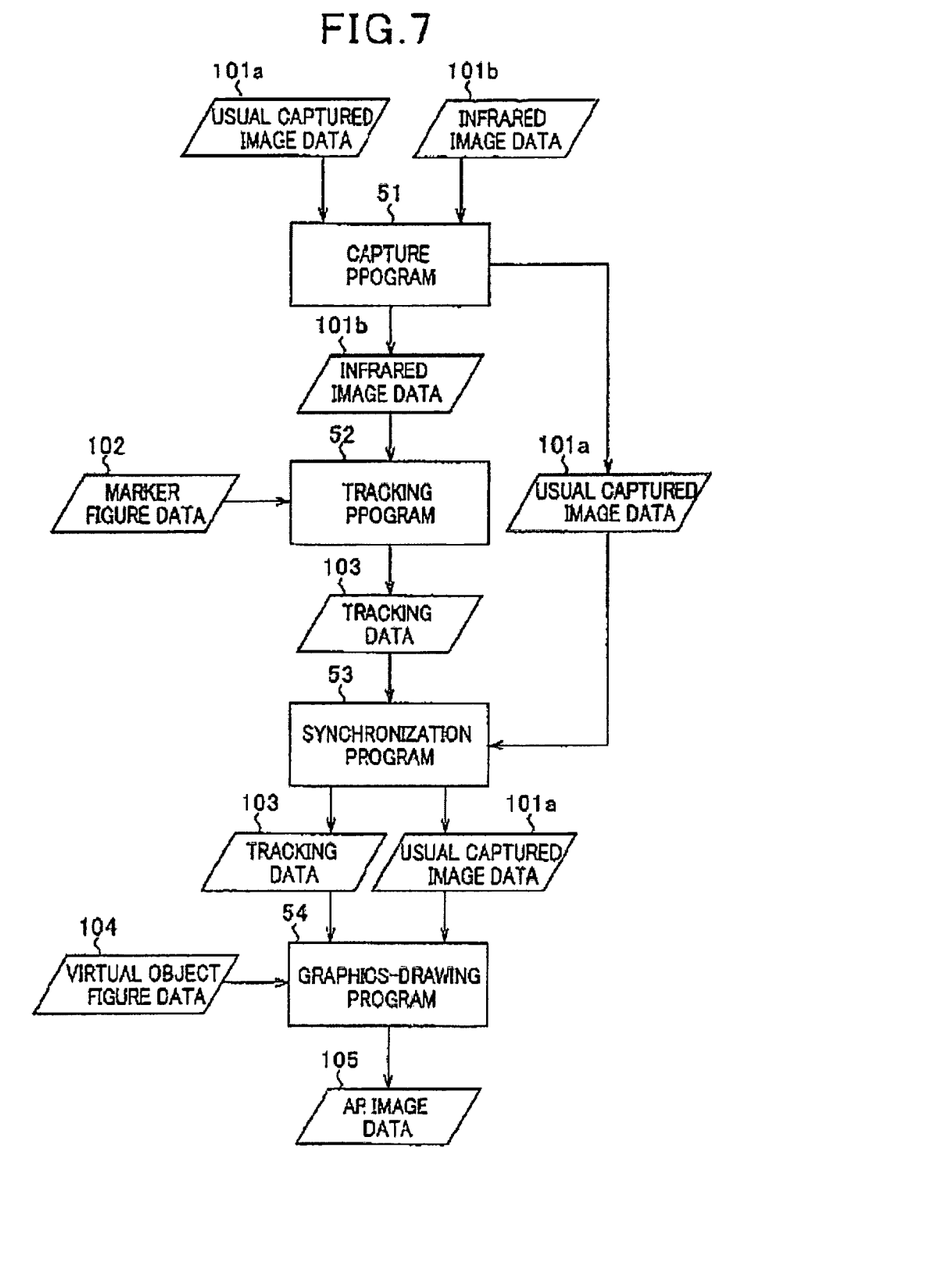
FIG. 7 is a view showing an example of software structure of a program for the AR system, and data flow, according to the second embodiment.

Referring now to FIG. 7, a software structure of program for AR system will be described.

FIG. 7 is a view showing an example of software structure of program for AR system, and data flow, according to a second embodiment. In FIG. 7, the same reference characters are added to the same constituent elements as in FIG. 3.

As shown in FIG. 7, a software structure of program for AR system is basically the same as a software structure of program for AR system according to the first embodiment.

Here, a capture program 51 is a program for causing a system control unit 25 to distribute a usual captured image data 101*a* (an example of visible-light image) and an infrared image data 101 *b* (an example of invisible-light image) which have been converted from a video signal by an image input unit 21, to a synchronization program 53 and a tracking program 52. Specifically, the system control unit 25 supplies the usual captured image data 101*a* to the synchronization program 53, while supplying the infrared image data 101*b* to the tracking program 52. The synchronization program is optional and the usual captured image data 101*a* might be directly sent to the graphics-drawing program 54.

The tracking program 52, based on the infrared image data 101*b*, discriminates a marker condition of marker M in an image of the data, and supplies this information as a tracking data to the synchronization program 53, or directly to the graphics-drawing program 54. In some cases, for example if the tracking program 52 also utilizes information from the real environment, image data 101*a* and 101*b* may be supplied to the tracking program 52.

The synchronization program 53 is a program for causing the system control unit 25 to check a time stamp of usual captured image data 101*a* supplied from the capture program 51, and a time stamp of tracking data 103 supplied from the tracking program 52, and correlate the usual captured image data 101a and the tracking data 103 whose time stamps indicate the same time (or nearly the same time), with each other, and supply them to a graphics-drawing program 54.

The graphics-drawing program 54 is a program for causing the system control unit 25 to determine an overlaying condition of virtual object as an image data of virtual object to be overlaid and displayed on the usual captured image data 101a, generate an image data of virtual object based on the overlaying condition, overlay the image data of virtual object on the usual captured image data 101a, and generate an AR image data. Here, since an image of marker M might be displayed in less contrast as in embodiment 1, for example because the usual sensorarray filters out more IR-light, an image of the usual captured image data 101a, the graphics-drawing program 54 may not need to be programmed to hide an image of marker M with an image of the virtual object or another virtual object, or erase an image of marker M. In case the usual sensorarray filters IR-light, as a usual camera in embodiment 1, the same hiding or erasing means can be applied. The main advantage of embodiment 2 is, that the tracking program 52 might function in a more stable fashion.

2.3 Operation of AR System

Figure 8:
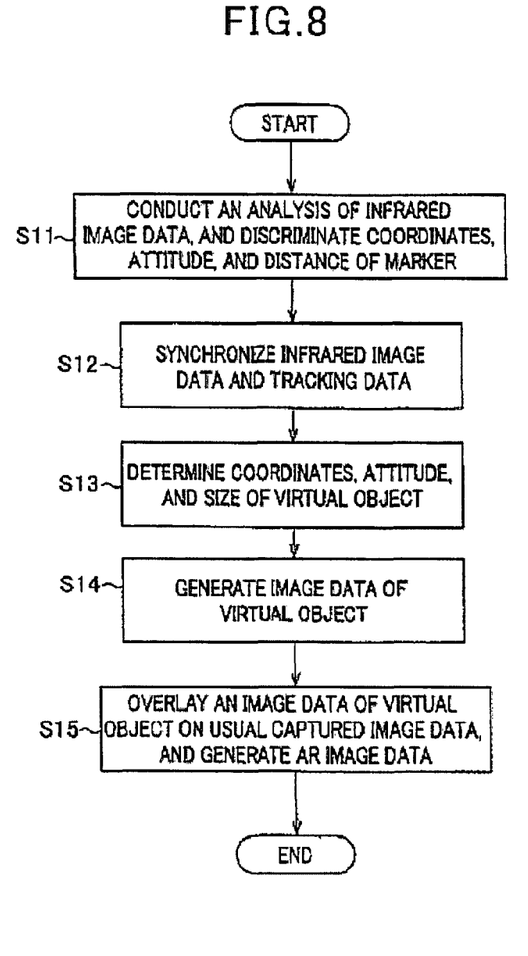
FIG. 8 is a flow-chart showing an example of process of system control unit 25 of PC 2 according to the second embodiment.

Referring now to FIG. 8, an operation of AR system S2 will be described.

FIG. 8 is a flow-chart showing an example of process of system control unit 25 of PC 2 according to the second embodiment.

First, a usual sensorarray 1a and an infrared sensorarray 1b start to capture an image by an operation of user or the like. A usual sensorarray 1a cannot capture an infrared mark printed on a marker M in high contrast, and does capture an image of place and an object to be image-captured, and outputs a video signal to a PC 2. When an infrared sensorarray 1b captures a marker M, the camera captures an infrared image including only an image of the infrared mark M, and outputs a video signal to the PC. However, in a case where a marker M is not within a range of image-capturing, the camera 1b captures an infrared image in which no object exists, and outputs a video signal to the PC2.

In the PC 2, the image input unit 21 converts a video signal supplied from the usual sensorarray 1a, to the usual captured image data 101a, and converts a video signal supplied from the infrared sensorarray 1b, to the infrared image data 101b, and outputs these data to the system control unit 25.

In a case where the infrared image data 101b is supplied from the image input unit 21, as shown in FIG. 8, the system control unit 25 conducts an analysis of the infrared image data 101b, discriminates a condition of mark, and generates its result as a tracking data 103 (step S11).

Then, the system control unit 25 synchronizes the usual captured image data 101a and the tracking data 103 with each other (step S12). This step may be optional.

When the system control unit 25 recognizes the synchronized usual captured image data 101a and tracking data 103, it determines an overlaying condition of virtual object based on the tracking data 103 or the like (step S13).

The system control unit 25, based on a virtual object figure data 104, generates an image data of virtual object which forms a determined overlaying condition (step S14).

The system control unit 25 overlays an image data of virtual object on the usual captured image data 101a to generate an AR image data, and stores the AR image data in a RAM or the storage unit 24 (step S15).

The generated AR image data is converted to a video signal by the image output unit 22, and is outputted to the display 3.

The display 3 displays an image corresponding to the supplied video signal on a screen. A marker M is not displayed on the screen.

As mentioned above, according to the embodiment, a marker M on which an infrared mark, which reflects infrared rays of predetermined wavelength, has been printed or somehow formed, is located in a space of the real world, and the usual sensorarray 1a captures an image in which mostly a visible light is discriminative, and outputs a video signal corresponding to the image. The infrared sensorarray 1b captures an image in which mostly infrared rays are discriminative, and outputs a video signal corresponding to the image. The system control unit 25 of the PC 2 discriminates coordinates and an attitude, and a distance from a view point of user, of image of marker M in the usual captured image data 101a corresponding to a video signal from the infrared sensorarray 1b, and determines coordinates and an attitude, and a distance from a view point of user, of virtual object as an image data of virtual object to be overlaid on an image corresponding to a video signal from the infrared sensorarray 1b, in correspondence with a condition of discriminated marker M. The system control unit 25, based on the determined overlaying condition, generates an image data of virtual object, and overlays the image data of virtual object on the usual captured image data 101a to generate an AR image data 105.

Accordingly, since an infrared mark printed on a marker M cannot be directly seen with the naked eye, it is possible to prevent, a place, an object, or the like on which a marker M is located, from being obstructive, in a case where they are directly seen. Further, an infrared mark is not seen on a display screen of the display 3, so it is possible to prevent a marker M from being obstructive on a screen.

Since an infrared mark printed on a mark M is not displayed on the usual captured image 101a, it might not be necessary to hide an image of marker M by an image of virtual object, or erase an image of marker M. Therefore, it is possible to improve a degree of freedom of determining an overlaying condition of virtual object, and it is possible to prevent degradation of image quality of AR image data, and it is possible to simplify a process.

Since an object other than an infrared mark is not displayed in the infrared image data 101b, it is possible to discriminate a marker condition easily.

In each of the above embodiments, an infrared mark is printed on a marker M by an infrared ink which reflects infrared rays of wavelength of 0.7-2.5 micrometer. However, for example, it is possible to print by ink which reflects infrared rays of wavelength other than the above, and it is also possible to print by ink which reflects an ultraviolet ink. In other words, it is sufficient to print by ink which cannot be recognized with the naked eye. In this case, it is sufficient that a distribution of sensitivity of the visible-light/infrared sensorarray 1 and the infrared sensorarray 1b is in correspondence with a property of reflectivity of ink. Other than ink, and paint which reflects infrared rays or the like, it is possible to use, for example, ink or paint or lamps, which itself radiate infrared rays or the like.

In the system control unit 25 of the PC 2 in each of the embodiments, coordinates, an attitude, and a distance from a view point of user, of marker M has been determined as a marker condition. However, it is possible to discriminate only one or two of these items.

In the system control unit 25 of the PC 2 in each of the embodiments, coordinates, an attitude, and a distance from a view point of user, of virtual object has been determined as an overlaying condition. However, it is possible to discriminate only one or two of these items.

In each of the embodiments, a moving image is displayed on the display 3 in real time. However, for example, it is possible to store it in a RAM or the storage unit 24 of the PC 2, or the like, and then, display it later. Further, it is also possible to display a freeze-frame image. Other than displaying an image by the display 3, for example, it is possible to print it by a printer apparatus. Further, it is also possible to record an AR image data 105 in a recorded medium such as a recordable DVD (Digital Versatile Disc), and then, utilize the data later.

In each of the embodiments, an image captured by a camera is arranged to be outputted to the PC 2 in real time. However, for example, it is possible that a captured image data or the like is recorded in a recorded medium such as a recordable DVD, a memory card, and the like at a camera side, and it is read by the PC 2 through a drive apparatus.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A composite image generating system, comprising a camera apparatus and an image processing apparatus, for overlaying a virtual image which is an image of a virtual object on a real image which is an image of the real world,
    wherein at least one mark which at least reflects or radiates invisible light of a particular wavelength other than visible light is added in a space of the real world,
    the image generating system comprises image capturing means for capturing the real image in which an invisible-light image may be discriminating, and
    the image processing apparatus, comprises:
        mark discriminating means for discriminating at least one condition of a position of an image of the mark in the captured real image, an orientation of the mark, and a distance from the mark to the image capturing means,
        overlaying condition determining means for determining, in correspondence with the discriminated condition, at least one overlaying condition which is at least one of an overlaying position which is a position of the image of a virtual object overlaid on the captured real image in the real image, an orientation of the virtual object which the image of the virtual object indicates, and a distance from a view point of a viewer, of the image of the virtual object, and
        mark image erasing means for specifying an area which the mark image occupies in the captured real image, and based on the image outside the area, complementing the image of the real world in the area, to erase the mark image in the real image in a way that the user is unable to extract a hidden code from the camera image in order to copy a mark.

2. The composite image generating system according to claim 1, wherein the image capturing means of the camera apparatus captures the real image in which a visible-light image and an invisible-light image may be discriminated from each other, and the image processing apparatus further comprises composite image generating means for, based on at least one determined overlaying condition, generating the image of at least one virtual object, overlaying the image of the virtual object on the captured real image, and generating the composite image.

3. The composite image generating system according to claim 1,
    wherein the overlaying condition determining means determines the overlaying position in such a way that the mark image is hidden by overlaying the image of the virtual object or another virtual object on the captured real image.

4. The composite image generating system according to claim 3,
    wherein a virtual object being used to hide the mark image is similar to a known background in the real image.

5. The composite image generating system according to claim 1,
    further comprising mark hiding means, which may use on or switch between erasing the mark image in the real image, complementing the image of the real world in the area of the mark from information outside the mark area and overlaying a virtual object or another virtual object over the real image of the mark and changing the mark image by image processing means.

6. An overlaying condition determining method in a composite image generating system for overlaying at least one virtual image which is an image of at least one virtual object on a real image which is an image of the real world to generate a composite image of the real world and the virtual object,
    wherein at least one mark which at least reflects or radiates invisible light of predetermined wavelength other than visible light is added in a space of the real world,
    a camera apparatus captures the real image in which an invisible-light image may be discriminating, and
    an image processing apparatus discriminates at least one condition of a position of image of the mark in the captured real image, an orientation of the mark, and a distance from the mark to the image capturing means, and
    determines, in correspondence with the at least one discriminated condition, at least one overlaying condition which is at least one of an overlaying position which is a position of the image of the at least one virtual object overlaid on the captured real image in the real image, an orientation of the at least one virtual object which the image of the at least one virtual object indicates, and a distance from a view point of a viewer, of the image of the at least one virtual object, and
    specifies an area which the mark image occupies in the captured real image, and based on the image outside the area, complements the image of the real world in the area, to erase the mark image in the real image in a way that the user is unable to extract a hidden code from the camera image in order to copy a mark.

7. An image processing apparatus for overlaying a virtual image which is an image of at least one virtual object on a real image which is an image of the real world to generate a composite image of the real world and the virtual object,
    wherein at least one mark which at least reflects or radiates invisible light of predetermined wavelength other than visible light is added in a space of the real world, the image processing apparatus comprises;
    acquiring means for acquiring the real image in which an invisible-light image may be discriminating, and which has been image-captured by a camera apparatus, mark discriminating means for discriminating at least one condition of a position of image of at least one mark in the acquired real image, an orientation of the mark, and a distance from the mark to the image capturing means, and overlaying condition determining means for determining, in correspondence with the discriminated condition, at least one overlaying condition which is at least one of an overlaying position which is a position of the image of at least one virtual object overlaid on the captured real image in the real image, an orientation of the virtual object which the image of the virtual object indicates, and a distance from a view point of viewer, of the image of the virtual object, and mark image erasing means for specifying an area which the mark image occupies in the captured real image, and based on the image outside the area, complementing the image of the real world in the area, to erase the mark image in the real image in a way that the user is unable to extract a hidden code from the camera image in order to copy a mark.

8. An image processing program executed by a computer included in an image-processing apparatus for overlaying a virtual image which is an image of at least one virtual object on a real image which is an image of the real world to generate a composite image of the real world and the at least one virtual object, wherein at least one mark which at least reflects or radiates invisible light of predetermined wavelength other than visible light is added in a space of the real world, and the image processing program causes the computer to function as:

acquiring means for acquiring the real image in which an invisible-light image may be discriminating, and which has been image-captured by a camera apparatus, mark discriminating means for discriminating at least one condition of a position of the image of at least one mark in the acquired real image, an orientation of the mark, and a distance from the mark, to the image capturing means, and overlaying condition determining means for determining, in correspondence with the discriminated condition, at least one overlaying condition which is at least one of an overlaying position which is a position of the image of the virtual object overlaid on the acquired real image in the real image, an orientation of the virtual object which the image of the virtual object indicates, and a distance from a view point of a viewer, of the image of the virtual object and mark image erasing means for specifying an area which the mark image occupies in the captured real image, and based on the image outside the area, complementing the image of the real world in the area, to erase the mark image in the real image in a way that the user is unable to extract a hidden code from the camera image in order to copy a mark.

9. A composite image generating system according to claim 1, wherein the at least one mark reflects or radiates invisible light of wavelength 0.7-2.5 micrometers.

10. An image processing apparatus for overlaying a virtual image which is an image of at least one virtual object on a real image which is an image of the real world to generate a composite image of the real world and the virtual object, wherein at least one mark which at least reflects or radiates invisible light of predetermined wavelength other than visible light is added in a space of the real world, wherein the at least one mark is a predetermined figure, the image processing apparatus comprises:

acquiring means for acquiring at least two real images which have been image-captured by a camera apparatus, with a first real image provided from a usual sensor array and a second real image in which an invisible-light image may be discriminating provided from an infrared sensor array of the camera apparatus, mark discriminating means for discriminating at least one condition of a position of image of at least one mark in the acquired second real image, an orientation of the mark, and a distance from the mark to the image capturing means, overlaying condition determining means for determining, in correspondence with the discriminated condition, at least one overlaying condition which is at least one of an overlaying position which is a position of the image of at least one virtual object overlaid on the captured real image in the first real image, an orientation of the virtual object which the image of the virtual object indicates, and a distance from a view point of viewer, of the image of the virtual object and wherein the at least one mark cannot be directly seen with a naked eye and is not displayed on the composite image of the real world and the virtual object.

11. An image processing apparatus according to claim 10, wherein the image processing apparatus further comprises mark image erasing means for specifying an area which the mark image occupies in the acquired second real image, and based on the image outside the area, complementing the image of the real world in the area, to erase the mark image in the first real image.

12. An overlaying condition determining method for overlaying at least one virtual image which is an image of at least one virtual object on a real image which is an image of the real world to generate a composite image of the real world and the virtual object, wherein at least one mark which at least reflects or radiates invisible light of predetermined wavelength other than visible light is added in a space of the real world, wherein the at least one mark is predetermined figure, a camera apparatus captures at least two real images with a first real image provided from a usual sensor array and a second real image in which an invisible-light image may be discriminating provided from a infrared sensor array of the camera apparatus, and an image processing apparatus discriminates at least one condition of a position of image of the mark in the captured second real image, an orientation of the mark, and a distance from the mark to the image capturing means, and determines, in correspondence with the at least one discriminated condition, at least one overlaying condition which is at least one of an overlaying position which is a position of the image of the at least one virtual object overlaid on the captured real image in the first real image, an orientation of the at least one virtual object which the image of the at least one virtual object indicates, and a distance from a view point of a viewer, of the image of the at least one virtual object, and wherein the at least one mark cannot be directly seen with a naked eye and is not displayed on the composite image of the real world and the virtual object.

* * * * *